UNITED STATES PATENT OFFICE.

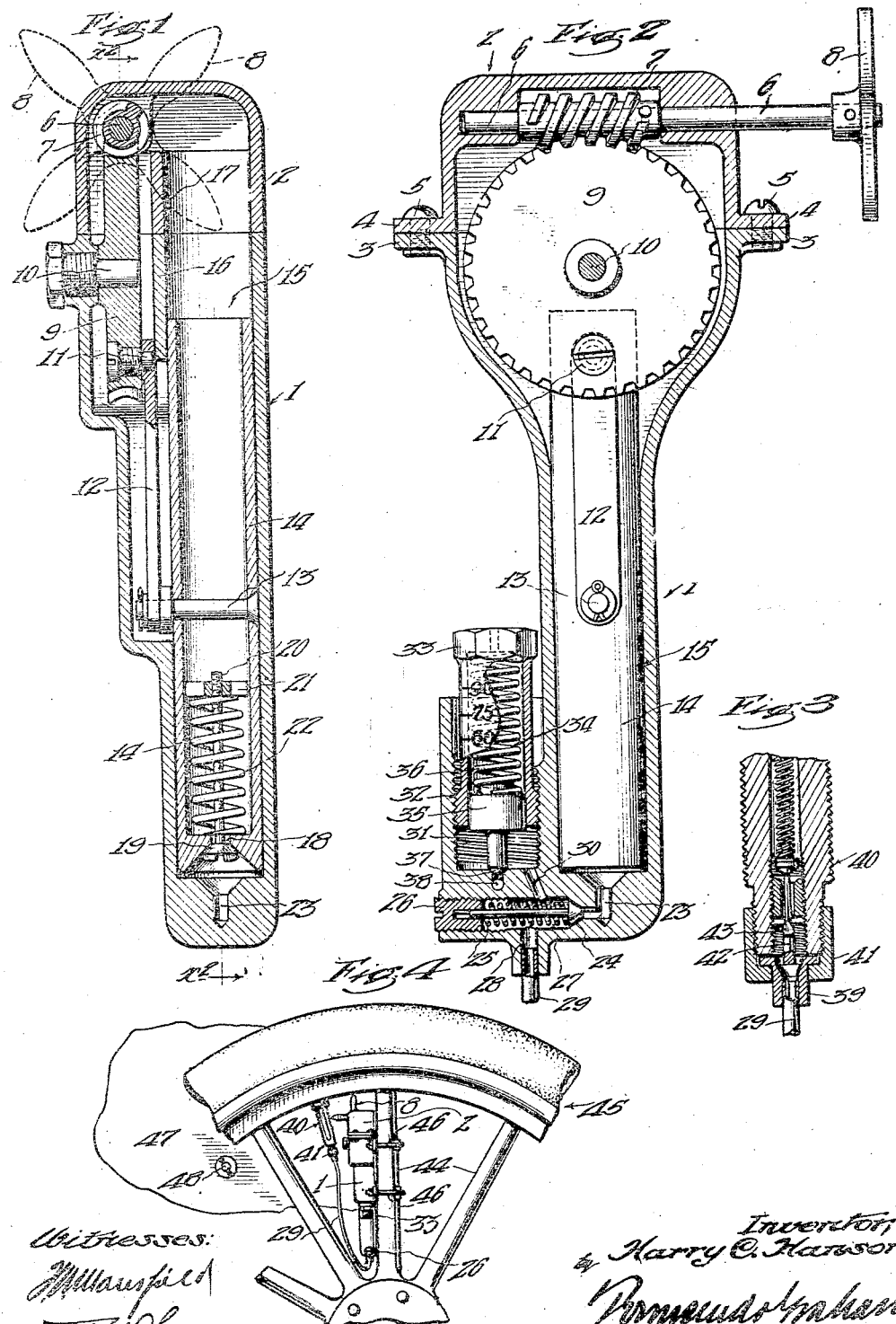

HARRY C. HANSON, OF SOUTH PASADENA, CALIFORNIA.

TIRE-PUMP.

1,142,701.  Specification of Letters Patent.  Patented June 8, 1915.

Application filed October 13, 1913.  Serial No. 795,028.

*To all whom it may concern:*

Be it known that I, HARRY C. HANSON, a citizen of the United States, residing at South Pasadena, in the county of Los Angeles and State of California, have invented a new and useful Tire-Pump, of which the following is a specification.

My invention relates to wheeled vehicles, and particularly to those employing pneumatic tires.

It is particularly important to maintain the air pressure in such tires at a constant pressure. Variations from this pressure greatly shorten the life of the tire, as higher pressures tend to strain and burst it, and lower pressures cause undue flexure, which rapidly destroys the tire. It is difficult to maintain the pressure constant in a tire, as there is nearly always more or less leakage from such a tire, tending to lower the pressure, and differences in temperature tend to vary the pressure. Considerable differences in temperature may occur over comparatively short periods of time.

The principal object of my invention is to provide means for maintaining the pressure in pneumatic tires within very close limits of a constant value.

A further object is to furnish means for this purpose which will be entirely automatic in their action and which may be adjusted to different air pressures to suit different varieties of tire or different conditions of operation.

A further object is to provide means for the above objects which may be readily attached to vehicles now in common use and which can be used with standard forms of tire, without necessitating any modification of the tire or valve.

Other objects and advantages will appear hereinafter.

Referring to the drawings which are for illustrative purposes only:

Figure 1 is a vertical section through a preferred form of my invention. Fig. 2 is a section on the line $x^2$—$x^2$ of Fig. 1. Fig. 3 is a section of a portion of the tire valve, together with the attachment means therefor. Fig. 4 is an elevation of a portion of the body of a vehicle and a portion of the wheel thereof.

In the form of my invention illustrated in these drawings, 1 is a body member which is provided with a cap 2, the body 1 and the cap 2 being secured together by means of flanges 3 and 4 and screws 5.

Mounted in the cap 2 is a shaft 6 to which is pinned a worm 7. The shaft 6 carries at its outer end a star wheel 8 which is pinned or otherwise rigidly secured thereto. The worm 7 engages a worm gear 9 which is carried on a shoulder screw 10 secured in the body member 1, as shown in Fig. 1. The worm gear 9 also carries a crank screw 11 which projects from the face of the worm gear 9 and upon which is pivoted a connecting rod 12. This connecting rod 12 extends downwardly and is pivoted upon a connecting rod pin 13. The connecting rod pin 13 is rigidly secured in a piston 14 which fits tightly in a bore 15 in the body member 1. The connecting rod 12 is prevented from slipping off the screw 11 and the worm gear 9 is prevented from slipping off the screw 10 by a partition 16 formed in the body member 1 and a partition 17 formed in the cap 2, the end of the screw 11 resting against these partitions and the various parts being restrained thereby. An opening 18 is provided in the lower end of the piston 14, this opening having a conical seat which is engaged by a valve 19.

The valve 19 is provided with a valve stem 20 and a valve stem nut 21. A spring 22 presses against the underside of the nut 21, thereby securely seating the valve 19 and closing the opening 18. The bottom of the bore 15 is provided with an opening 23 which is normally closed by a valve 24 which is actuated by a spring 25 which presses against a plug 26. The opening 23 communicates with a chamber 27 in which the valve 24 and the spring 25 are placed.

An opening 28 communicates with the chamber 27. A flexible metal pipe 29 is securely fastened in the opening 28 and serves to conduct air to the tire, as will hereinafter be explained.

A small opening 30 is provided which is also in communication with the chamber 27. This opening 30 communicates with a regulator chamber 31. The regulator chamber 31 is internally threaded, as shown at 32, and a regulator piston body 33 is provided with threads to engage the threads at 32.

The upper end of the regulator piston body 33 is provided with a hexagon nut by means of which it may be screwed up or down in the regulator chamber 31.

An opening 34 is provided inside the regulator piston body 33 and a regulator piston 35 fits tightly therein, being forced downwardly by a spring 36. This regulator piston 35 is provided with a needle valve 37 which closes an opening 38 which provides communication between the regulator chamber 31 and the outer air. The outer surface of the regulator piston body 33 is calibrated with the pressure at which the piston releases.

The metal pipe 29 is preferably of soft, flexible copper of small diameter and terminates in a member 39 which is adapted to be secured to a valve body 40 of the tire to be regulated by means of a clamping nut 41. The member 39 is provided with a bridging member 42 which is adapted to extend into the valve body 40 and to engage a valve stem 43 of the tire.

I prefer to attach my invention to a spoke 44 of a wheel 45 by means of bolts 46. When so attached, the star wheel 8 projects from the wheel toward the body of a vehicle 47. A projecting pin 48 is rigidly secured to the vehicle 47 in such a manner that it engages and turns the star wheel 8 as the wheel revolves.

The method of operation of my invention is as follows:—The pump being secured to the spoke 44 of the wheel 45 by means of the bolts 46, the star wheel projects and is engaged and turned by the pin 48 as the wheel revolves. This movement of the star wheel 8 actuates the worm 7 through the shaft 6, and the worm 7 rotates the worm gear 9. The worm gear 9 actuates the piston 14 through the connecting rod 12, reciprocating this piston slowly as the wheel 45 turns. Starting with the position shown in Fig. 1, the piston 14 first moves upwardly. This movement tends to cause a vacuum in the space below the piston, as the valve 24 tightly closes the opening 23. The external pressure of the atmosphere acting upon the valve 19 forces this valve from its seat against the pressure of the spring 22, and air is drawn into the space below the piston 14 during this upstroke. As soon as the piston 14 starts downwardly, the valve 19 is forced against its seat by the action of the spring 22 and air is compressed below the piston 14. The pressure of this compressed air acts against the valve 24 and tends to raise it from its seat, thereby increasing the pressure of the air in the tire and in the regulator chamber 31. It will be noted that the valve in the valve stem 40 has been rendered inoperative by the projection 42, pressing down upon the valve stem 43 so that the interior of the tire is in open communication through the pipe 29 with the regulator chamber 31 and with the chamber 27. The pump moves relatively slowly and is of small capacity so that the increase in pressure is very slow. When, however, the pressure reaches a pre-determined value, it acts upon the piston 35, forcing it upwardly against the action of the spring 36 and allowing air to escape through the opening 38, due to the needle valve 37 being lifted. The pressure on the tire is thereby relieved, the needle valve 37 closing as soon as this is accomplished. It is desirable to be able to adjust the pressures carried on the tire, and this is done by screwing the regulator piston body 33 in or out, thereby increasing or diminishing the pressure of the spring 36.

The principal object of the gearing illustrated is to provide a relatively slow piston speed in the pump. It is partly for this purpose that the worm gear 9 is used and partly to allow of intermittent actuation of the piston 14 with proper locking of this piston when it is at rest. This well known property of worm gearing is of very considerable value in this connection. As the pin 48 strikes the star wheel 8 and actuates it air is compressed under the piston. This air is elastic and tends to force the piston back to its original position. This is prevented by the worm gearing which is of such proportions that it cannot be driven backward.

It is perfectly possible to pump up a tire by means of my invention by the simple process of running the vehicle. When, however, there is no air in the tires, this is extremely destructive to such tires, and in such cases I prefer to disconnect the pipe 29 from the valve stem 40 and to pump up the tire by the ordinary means, the ordinary valve of the tire holding the pressure as it is put in. My invention will thereafter supply sufficient air to maintain this pressure constant. Should more air be desired, the needle valve will lift and relieve any excessive pressure due to any heating of the air within the tire.

I claim as my invention:

1. A pump for a pneumatic tire comprising a body member, a piston sliding in an opening in said body member, a gear in said body member, a crank pin on said gear, a connecting rod between said crank pin and said piston, a worm for actuating said gear, and means operated by the rotation of the wheel on which the tire is fixed for actuating said worm.

2. A pump for a pneumatic tire comprising a body member provided with points for attachment to a wheel, a piston sliding in an opening in said body member, a gear in said body member, a crank pin on said gear, a connecting rod pivoted on said crank pin and on said piston, a worm engaging said gear and supported in said body member, and a star wheel rigidly secured to said worm and so placed that it engages a stationary pin as the wheel turns.

3. A pump for a pneumatic tire comprising a body, means for attaching the body to the wheel on which the tire is mounted, air compressing means in said body, operating mechanism for said air compressing means, a star wheel, means for causing said star wheel to actuate said operating mechanism, and turning means for engaging and turning said star wheel, said turning means being secured to the vehicle which employs the wheel.

In testimony whereof, I have hereunto set my hand at Los Angeles, California, this 4th day of October, 1913.

HARRY C. HANSON.

In presence of—
   FRED A. MANSFIELD,
   FORD W. HARRIS.